(12) United States Patent
Baldwin et al.

(10) Patent No.: US 8,558,111 B1
(45) Date of Patent: Oct. 15, 2013

(54) ROUND BOX TO SINGLE GANG COVER ADAPTER

(75) Inventors: Jeffrey P. Baldwin, Phoenix, AZ (US);
Richard L. Cleghorn, Tempe, AZ (US);
Michael J. Shotey, Las Vegas, NV (US);
Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 218 days.

(21) Appl. No.: 12/895,608

(22) Filed: Sep. 30, 2010

Related U.S. Application Data

(60) Provisional application No. 61/248,311, filed on Oct. 2, 2009.

(51) Int. Cl.
*H02G 3/14* (2006.01)

(52) U.S. Cl.
USPC .............................................. 174/67; 174/66

(58) Field of Classification Search
USPC .......................................................... 174/67
See application file for complete search history.

(56) References Cited

U.S. PATENT DOCUMENTS

| | | |
|---|---|---|
| 872,694 A | 12/1907 | Thiem |
| 946,648 A | 1/1910 | Pratt |
| 1,228,731 A | 6/1917 | Abbott et al. |
| 1,608,621 A | 11/1926 | Sachs |
| 1,784,277 A | 12/1930 | Darlington |
| 1,952,719 A | 3/1934 | Lawlin |
| 2,240,187 A | 4/1941 | Kingdon et al. |
| 2,321,640 A | 6/1943 | Adkins |
| 2,596,236 A | 5/1952 | Gloster |
| 3,104,774 A | 9/1963 | Hudson et al. |
| 3,252,611 A | 5/1966 | Weitzman et al. |
| 3,431,736 A | 3/1969 | Wagner |
| 3,432,611 A | 3/1969 | Gaines et al. |
| 3,438,534 A | 4/1969 | Zerwes |
| 2,918,733 A | 12/1969 | Hirsch |
| 3,491,327 A | 1/1970 | Tait et al. |
| 3,518,358 A | 6/1970 | Friedman |
| 3,525,450 A | 8/1970 | Payson |
| 3,530,230 A | 9/1970 | Comier et al. |
| 3,544,703 A | 12/1970 | Jones |
| 3,564,112 A | 2/1971 | Algotsson |
| 3,690,035 A | 9/1972 | Schindlauer |
| 3,895,179 A | 7/1975 | Wyatt |
| 3,965,287 A | 6/1976 | Mueller |
| 4,032,030 A | 6/1977 | Bass et al. |
| 4,197,959 A | 4/1980 | Kramer |
| 4,342,493 A | 8/1982 | Grenell |
| 4,343,411 A * | 8/1982 | Chesnut et al. ............... 220/242 |

(Continued)

OTHER PUBLICATIONS

34 UL 514 C-38, Dec. 26, 1996, pp. 34-35.

(Continued)

*Primary Examiner* — Timothy Thompson
*Assistant Examiner* — Rhadames J Alonzo Miller
(74) *Attorney, Agent, or Firm* — Mark S. Bicks; Alfred N. Goodman

(57) ABSTRACT

An adapter plate for mounting an electrical device including an adapter having a first surface, a second surface opposite the first surface, an outer perimeter, and an inner perimeter, a gasket for installing between a round electrical box and the second surface of the adapter, and wherein the adapter outer perimeter comprises two straight sides and two concave sides.

19 Claims, 1 Drawing Sheet

(56) References Cited

U.S. PATENT DOCUMENTS

| | | |
|---|---|---|
| 4,424,407 A | 1/1984 | Barbic |
| 4,500,746 A | 2/1985 | Meehan |
| 4,737,599 A | 4/1988 | Fontaine |
| 4,757,908 A | 7/1988 | Medlin, Sr. |
| 4,833,277 A | 5/1989 | Jacoby, Jr. et al. |
| 4,844,275 A | 7/1989 | Schnell et al. |
| 4,998,635 A | 3/1991 | Vink et al. |
| 5,072,848 A | 12/1991 | Pipis et al. |
| 5,076,641 A | 12/1991 | Lindberg |
| 5,161,983 A | 11/1992 | Ohno et al. |
| 5,178,350 A | 1/1993 | Vink et al. |
| 5,280,135 A | 1/1994 | Berlin et al. |
| 5,317,108 A | 5/1994 | Prairie, Jr. |
| D350,530 S | 9/1994 | Comerci et al. |
| 5,362,924 A | 11/1994 | Correnti |
| 5,456,373 A | 10/1995 | Ford |
| 5,486,650 A | 1/1996 | Yetter |
| 5,556,289 A | 9/1996 | Holbrook, Jr. |
| 5,594,205 A | 1/1997 | Cancellieri et al. |
| 5,651,696 A | 7/1997 | Jennison |
| 5,731,544 A | 3/1998 | Burck et al. |
| 5,763,831 A | 6/1998 | Shotey et al. |
| 5,779,083 A | 7/1998 | Bordwell |
| 6,066,805 A | 5/2000 | Bordwell et al. |
| 6,133,531 A | 10/2000 | Hayduke et al. |
| 6,222,123 B1 | 4/2001 | Schwarz |
| 6,237,242 B1 | 5/2001 | Woytassek et al. |
| 6,420,653 B1 | 7/2002 | Shotey et al. |
| 6,420,654 B1 | 7/2002 | Shotey et al. |
| 6,441,307 B1 | 8/2002 | Shotey et al. |
| 6,476,321 B1 | 11/2002 | Shotey et al. |
| 6,722,621 B2 * | 4/2004 | Johnson ............... 248/343 |
| 6,770,816 B2 | 8/2004 | Shotey et al. |
| 6,987,225 B2 | 1/2006 | Shotey et al. |
| 7,119,277 B1 | 10/2006 | Shotey et al. |
| 7,301,100 B2 * | 11/2007 | Drane et al. .............. 174/67 |
| 7,323,639 B1 | 1/2008 | Shotey et al. |
| 7,348,486 B1 | 3/2008 | Shotey et al. |
| 7,462,775 B1 * | 12/2008 | Gretz .............. 174/50 |
| 7,829,788 B2 * | 11/2010 | Binder et al. .............. 174/66 |
| 8,003,886 B1 * | 8/2011 | Rintz .............. 174/66 |
| 2008/0289846 A1 * | 11/2008 | Wimberly ............ 174/67 |
| 2010/0101818 A1 * | 4/2010 | Junjie .............. 174/66 |
| 2012/0111596 A1 * | 5/2012 | Mortun et al. .......... 174/50.5 |

OTHER PUBLICATIONS

Pass & Seymour, "Trademaster Weatherproof While-In-Use-Covers", Apr. 1999, Catalog No. WIUC20C.
Intermatic incorporated, "Flexi-Guard", 2000, pp. 1-4.

\* cited by examiner

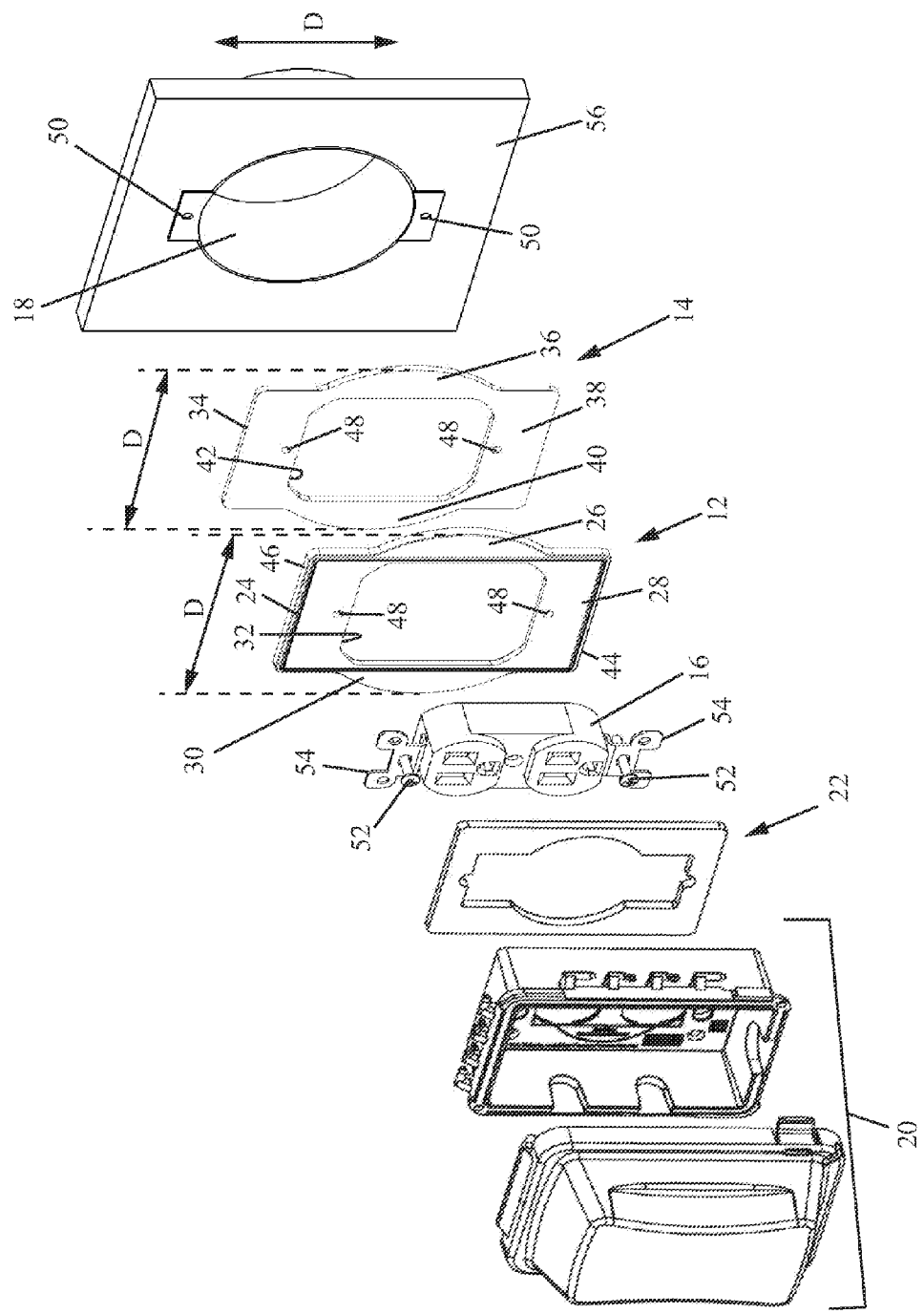

ROUND BOX TO SINGLE GANG COVER ADAPTER

CROSS REFERENCE TO RELATED APPLICATIONS

This application claims the benefit of the filing date of U.S. Provisional Patent Application 61/248,311 entitled "ROUND BOX TO SINGLE GANG COVER ADAPTER" to Baldwin et al. which was filed on Oct. 2, 2009, the contents of which are hereby incorporated herein by reference.

BACKGROUND

1. Technical Field

Aspects of this document relate generally to electrical outlet covers and adapters for the same.

2. Background Art

Electrical boxes are manufactured in a variety of shapes and sizes. Electrical boxes may be rectangular with one, two, three, or more gangs, each arranged to receive an electrical device. Round electrical boxes may be used to support ceiling fans or other electrical devices. However, if a homeowner desires to locate a non-round electrical device within the round electrical box, he is unable to due to gaps on the side. Specifically, the round box is larger than the electrical device and could create openings which provide the potential for an electrical shock hazard.

SUMMARY

Aspects of this document relate to adapter plates. In one aspect, an adapter plate for mounting an electrical device includes an adapter having a first surface, a second surface opposite the first surface, an outer perimeter, and an inner perimeter, a gasket for installing between a round electrical box and the second surface of the adapter, and wherein the adapter outer perimeter includes two straight sides and two concave sides.

Particular implementations may comprise one or more of the following features. The straight sides may be arranged opposite one another and the convex sides are arranged opposite one another. The convex sides may define a diameter and the straight sides extend beyond the diameter. A mounting hole may be located in each of the straight sides. The inner perimeter may be generally rectangular in shape. The inner perimeter may be sized to receive an electrical device therein. The adapter plate may also include an outer gasket contacting the first surface of the adapter. The adapter plate may also include an in-use cover contacting the outer gasket. The adapter may be secured to the round electrical box with a plurality of screws. The adapter plate assembly may also include an electrical device, wherein the electrical device and the adapter are secured to the round electrical box with the plurality of screws. The electrical device, the adapter, and the gasket may be secured to the round electrical box with the plurality of screws. The outer perimeter may completely encompass the round electrical box. The inner perimeter may be completely within the round electrical box.

In another aspect, a system for mounting an electrical device includes a round electrical box having an outer diameter and mounted in a wall, a gasket having an outer diameter and an inner perimeter, an adapter having an outer diameter and an inner perimeter, and electrical device, wherein the electrical device, the adapter, and the gasket are secured to the round electrical box with a plurality of fasteners, and wherein the round electrical box, the gasket, and the adapter have equal outer diameters.

In particular implementations, the gasket and adapter inner perimeters may be sized to receive the electrical device. The gasket and the adapter may each include a pair of mounting tabs extending beyond the outer diameter. The system may further include a pair of convex sides. The system may further include a pair of straight sides adjacent the convex sides. The system may further include an outer gasket contacting a front side of the adapter and an in-use cover contacting the outer gasket. The system may also include a second adapter connected to the in-use cover, wherein the second adapter is arranged to fit a predetermined electrical device.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 1 is an exploded view of a round electrical box with a single gang adapter plate, an electrical device, and a while-in-use cover.

DESCRIPTION

This disclosure, its aspects and implementations, are not limited to the specific components or assembly procedures disclosed herein. Many additional components and assembly procedures known in the art consistent with the intended operation and assembly procedures for an electrical box adapter will become apparent for use with implementations of an electrical box adapter from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box adapter.

FIG. 1 illustrates an electrical box adapter assembly 10. Assembly 10 includes an adapter plate 12 and an adapter gasket 14 to secure an electrical device 16 within round electrical box 18. Finally, a while-in-use cover 20 with a gasket 22 may be used to protect electrical device 16 from rain and snow. Adapter plate 12 may include a top wall 24, a right wall 26, a bottom wall 28, and a left wall 30 which surround an inner opening 32. Adapter gasket 14 is preferably shaped similar, if not identical, to adapter plate 12 and includes a top wall 34, a right wall 36, a bottom wall 38, and a left wall 40 which surround an inner opening 42.

Adapter plate 12 also includes a first surface 44 facing away from the electrical box and a second surface 46 directed towards the electrical box and in contact with adapter gasket 14. In top walls 24/34 and bottoms walls 28/38, a mounting hole 48 is located on the straight walls and is preferably aligned with threaded holes 50 in electrical box 18. Mounting holes 48 are arranged to receive screws 52 that are fastened within threaded holes 50. Accordingly, adapter plate 12, gasket 14, and electrical device 16 may be secured together as a single assembly to electrical box 18 in one aspect and electrical device 16 fits within inner openings 32 and 42. Further, screws 52 may extend through openings in yoke 54 of the electrical device.

Electrical box 18 is preferably mounted within wall 56 and is flush with a front surface of the wall. Electrical box 18 also includes a diameter D which is approximately equal to the diameter of adapter plate walls 26 and 30 as well as adapter gasket walls 36 and 40. Due to adapter plate 12 and adapter gasket 14 having an outer perimeter diameter D approximately equal to, or even slightly larger in size than the electrical box diameter, the adapter plate and adapter gasket limit access to the internals of the electrical box while properly securing a single gang electrical device.

Top walls 24 and 34 and bottom walls 28 and 38 are preferably arranged opposite one another with straight sides in one aspect, while right walls 26 and 36 and left walls 30 and 40 are convex in shape with the curved portion directed outwards.

Thus it is seen that an adapter plate 12 and gasket 14 permit the user to install an electrical device within a round electrical box without having to replace the electrical box with a rectangular style box.

It will be understood that implementations are not limited to the specific components disclosed herein, as virtually any components consistent with the intended operation of a method and/or system implementation for an adapter plate may be utilized. Accordingly, for example, it should be understood that, while the drawing figures and accompanying text show and describe a generally rectangular adapter plate, an adapter plate of the present invention may contain any number of sides so long as it is complimentary shaped to the electrical box. Common electrical box shapes also include round, square, and octagonal. Components may comprise any shape, size, style, type, model, version, class, grade, measurement, concentration, material, weight, quantity, and/or the like consistent with the intended operation of a method and/or system implementation for an adapter plate.

The concepts disclosed herein are not limited to the specific implementations shown herein. For example, it is specifically contemplated that the components included in a particular implementation of an adapter plate may be formed of any of many different types of materials or combinations that can readily be formed into shaped objects and that are consistent with the intended operation of an adapter plate. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the adapter plate may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an adapter plate, it should be readily apparent that a number of modifications may be made without departing from the spirit thereof and that these implementations may be applied to other adapter plates. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. An adapter plate system for mounting an electrical device comprising:
    an adapter comprising a first surface, a second surface opposite the first surface, an outer perimeter, an inner opening large enough to receive an electrical device therethrough, and two mounting holes each positioned to receive a different box mounting screw of the electrical device, the outer perimeter comprising two straight sides and two convex sides; and
    a gasket for installing between a round electrical box and the second surface of the adapter, the gasket comprising an inner opening large enough to receive an electrical device therethrough, two mounting holes each positioned to receive a different box mounting screw of the electrical device, two straight sides, and two convex sides.

2. The adapter plate system of claim 1 wherein the straight sides of the adapter and the gasket are arranged opposite one another and the convex sides of the adapter and the gasket are arranged opposite one another.

3. The adapter plate system of claim 1 wherein the convex sides define a diameter and a distance between the straight sides is greater than the diameter.

4. The adapter plate system of claim 1 wherein the inner opening is generally rectangular in shape.

5. The adapter plate system of claim 1 further comprising an outer gasket contacting the first surface of the adapter.

6. The adapter plate system of claim 5 further comprising an in-use cover contacting the outer gasket.

7. The adapter plate system of claim 5, wherein the electrical device is coupled to the round electrical box with the adapter and the gasket positioned between yokes of the electrical device and the round electrical box, the mounting screws of the electrical box extending through the mounting holes on the adapter and the gasket into threaded holes on the round electrical box.

8. The adapter plate system of claim 1 wherein the outer perimeter completely encompasses the round electrical box.

9. The adapter plate system of claim 1 wherein the inner opening is smaller than the round electrical box.

10. A system for mounting an electrical device to a round electrical box comprising:
an adapter plate comprising:
an inner opening large enough to receive a back surface of the electrical device;
two mounting holes positioned to align with two mounting screws of the electrical device and two threaded holes of the round electrical box when the adapter plate is mounted between yokes of the electrical device and the round electrical box;
two opposing straight sides; and
two opposing convex sides.

11. The system of claim 10 further comprising a first gasket, the first gasket comprising:
an inner opening large enough to receive the back surface of the electrical device;
two mounting holes positioned to align with the two mounting holes of the adapter plate, the two mounting screws of the electrical device, and the two threaded holes of the round electrical box when the first gasket is mounted between the adapter plate and the round electrical box;
two opposing straight sides; and
two opposing convex sides.

12. The system of claim 11 wherein diameters of the convex sides of the adapter plate and the first gasket are substantially equal to a diameter of the round electrical box.

13. The system of claim 12, further comprising an in-use cover configured to couple to the adapter plate opposite the first gasket.

14. The system of claim 13, further comprising an second gasket positioned between the in-use cover and the adapter plate when the in-use cover is coupled to the adapter plate.

15. The system of claim 14 further comprising a second adapter connected to the in-use cover, wherein the second adapter is arranged to fit a predetermined electrical device.

16. A method of mounting an electrical device to a round electrical box, comprising:
inserting two mounting screws on the electrical device through two mounting apertures on an adapter plate comprising an inner opening sized to receive a back surface of the electrical device, two opposing straight walls, and two opposing convex walls;
mounting the adapter plate between yokes of the electrical device and the round electrical box; and
threadedly coupling the two mounting screws of the electrical device with two threaded holes on the round electrical box.

17. The method of claim 16, further comprising:
mounting a first gasket between the adapter plate and the round electrical box, the adapter plate comprising an inner opening sized to receive a back surface of the electrical device, two mounting apertures two opposing straight walls, and two opposing convex walls; and
inserting the two mounting screws of the electrical device through the two mounting apertures of the first gasket.

18. The method of claim 17, further comprising coupling an in-use cover to the electrical device opposite the adapter plate.

19. The method of claim 18, further comprising mounting a second gasket between the in-use cover and the adapter plate.

* * * * *